(12) United States Patent
Jallo-Jamboria

(10) Patent No.: US 10,390,196 B2
(45) Date of Patent: Aug. 20, 2019

(54) SYSTEM AND METHOD FOR CONTACTING EMERGENCY SERVICES

(71) Applicant: Ahmed Yassin Jallo-Jamboria, Silver Spring, MD (US)

(72) Inventor: Ahmed Yassin Jallo-Jamboria, Silver Spring, MD (US)

( * ) Notice: Subject to any disclaimer, the term of this patent is extended or adjusted under 35 U.S.C. 154(b) by 45 days.

(21) Appl. No.: 15/727,702

(22) Filed: Oct. 9, 2017

(65) Prior Publication Data

US 2018/0146321 A1 May 24, 2018

Related U.S. Application Data

(63) Continuation of application No. 15/356,465, filed on Nov. 18, 2016, now abandoned.

(51) Int. Cl.
| | | |
|---|---|---|
| G06F 15/16 | (2006.01) | |
| H04W 4/60 | (2018.01) | |
| H04W 4/12 | (2009.01) | |
| H04L 12/58 | (2006.01) | |
| H04W 4/90 | (2018.01) | |

(52) U.S. Cl.
CPC ............ H04W 4/60 (2018.02); H04L 51/20 (2013.01); H04W 4/12 (2013.01); H04W 4/90 (2018.02)

(58) Field of Classification Search
CPC ......... H04L 51/20; H04L 51/32; H04L 12/58; H04W 4/003; H04W 4/12; H04W 4/60; H04W 4/90; H04W 4/02
See application file for complete search history.

(56) References Cited

U.S. PATENT DOCUMENTS

| | | | |
|---|---|---|---|
| 8,045,654 B1 | 10/2011 | Anderson | |
| 9,014,660 B2 | 4/2015 | Pahlevani | |
| 2013/0102271 A1* | 4/2013 | Stempski | H04W 4/90 455/404.2 |
| 2013/0196614 A1* | 8/2013 | Pahlevani | H04W 4/90 455/404.2 |
| 2013/0300563 A1* | 11/2013 | Glaze | G08B 13/22 340/568.1 |
| 2013/0316751 A1* | 11/2013 | Rao | G06Q 10/10 455/517 |
| 2015/0038109 A1* | 2/2015 | Salahshour | H04W 4/90 455/404.2 |
| 2015/0111524 A1* | 4/2015 | South | H04W 4/90 455/404.2 |
| 2015/0365246 A1* | 12/2015 | Kane | H04L 12/1895 709/203 |

(Continued)

Primary Examiner — Benjamin M Thieu
(74) Attorney, Agent, or Firm — Andrew G. Morabito

(57) ABSTRACT

A method for connecting emergency personnel with an emergency situation, the method comprising, detecting that a request for assistance is made by a submitter, gathering a set of data from the submitter, analyzing the set of data from the submitter to determine information about the emergency situation to determine the appropriate emergency to request respond to the request, locating at least one member of the emergency service within a predetermined area based on the emergency situation, determining if the at least one member of the emergency service is available to respond to the request, and providing the at least one member of the emergency service with a portion of the set of data about the request.

9 Claims, 4 Drawing Sheets

(56) References Cited

U.S. PATENT DOCUMENTS

| | | | |
|---|---|---|---|
| 2016/0027292 A1* | 1/2016 | Kerning | H04W 4/90 455/404.2 |
| 2016/0057595 A1* | 2/2016 | Ahmed | H04W 4/02 455/404.1 |
| 2016/0142894 A1* | 5/2016 | Papakonstantinou | H04W 4/023 455/404.1 |
| 2016/0277892 A1* | 9/2016 | Walker | H04W 4/90 |
| 2017/0024088 A1* | 1/2017 | La Pean | G06Q 50/265 |
| 2017/0086050 A1 | 3/2017 | Kerning et al. | |

* cited by examiner

SYSTEM AND METHOD FOR CONTACTING EMERGENCY SERVICES

BACKGROUND

The present invention relates generally to the field of alerting emergency services to an emergency situation, and more particularly to alerting the proper emergency services in real time and within a predetermined distance from the scene of the emergency situation.

Millions of accidents and emergency situations happen every year and throughout the world. In the vast majority of these situations, the parties involved or witnesses need to contact the police, fire department, ambulance, or other services that are required to assist in the situation. Emergency calling involves a communication device dialing a short number to reach emergency help when an emergency is experienced. For example, in the United States '911' may be dialed by a communication device. Once '911' is dialed, the emergency personnel on the other end gathers the information about the accident and sends the information to the appropriate services. These personnel sometimes are the ones available to respond or within their district or city limits.

Unless calling from a landline, the person calling has to relay their location to the emergency personnel. Recently, mobile cell phones have become the primary means of communication in society. While many emergency systems and Public Safety Answering Points (PSAP) are able to determine a caller's location from a landline, and in some instances, they may have difficulty obtaining sufficiently-accurate location information for services calls made from mobile phones because of the person calling having difficulty properly explaining their location to the service provider. This is hugely significant in today's mobile world as, according to the FCC, over 70% of emergency calls are now being made via cell phone.

It is difficult for the emergency personnel to sometimes locate the individual calling if they do not know where they are. If the person is injured they may not be able to properly address the type of emergency or the most relevant and useful pieces of information for the emergency personnel. In some instances, the person calling may not be able to relay any information or may give incorrect information which further delays emergency services from arriving at the scene. There may be some situations where a caller can competently furnish the emergency service with accurate information and this only further increases the emergency services ability to arrive at the scene.

Therefore, it is desired, for a method and system to allow instant global positioning of the person contacting the emergency personnel with their location, the type of emergency, and relay this information directly and instantaneously to the proper emergency services.

SUMMARY

Embodiments of the present invention disclose a method, a computer program product, and a computer system for connecting emergency personnel with an emergency situation, the method comprising. Aspects of an embodiment of the present invention include an approach for detecting that a request for assistance is made by a submitter, gathering set of data from the submitter, analyzing the set of data from the submitter to determine information about the emergency situation to determine the appropriate emergency to request respond to the request, locating at least one member of the emergency service within a predetermined area based on the emergency situation, determining if the at least one member of the emergency service is available to respond to the request, and providing the at least one member of the emergency service with a portion of the set of data about the request.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention recognize that there are many different methods and standards for electing and using a manager that controls the configuration within a network. Embodiments of the present invention disclose an approach to elect a manager that controls the configuration within the network and also the tasks performed by the configuration manager within a network. An approach allows enforcing configuration in a way that does not break network connectivity and prevents failed or run-away nodes to enforce stale configuration.

The present invention will now be described in detail with reference to the Figures.

Figure 1:
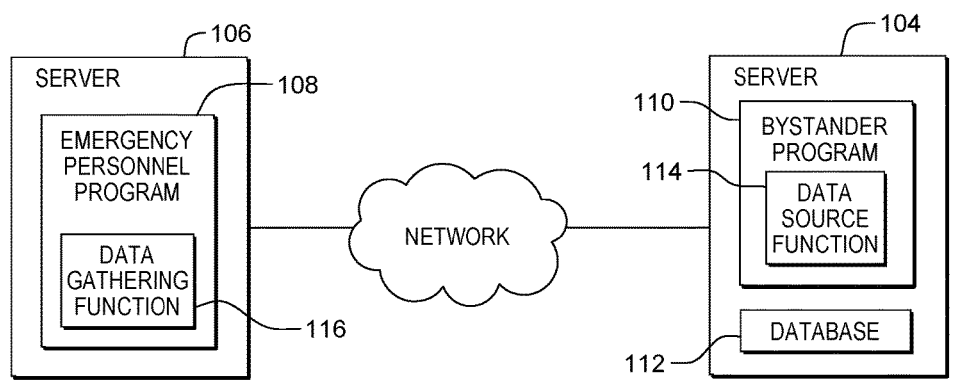
FIG. 1 depicts a block diagram of a computing environment, in accordance with one embodiment of the present invention.

FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes computing device 104, server 106, interconnected over network 102. As depicted, computing environment 100 provides an environment for emergency personnel program 108 to access witness program 110 through network 108. Computing environment 100 may include additional servers, computers, or other devices not shown.

Network 108 may be a local area network (LAN), a wide area network (WAN) such as the Internet, any combination thereof, or any combination of connections and protocols that may support communications between computing device 104, server 116, and server 118 in accordance with embodiments of the invention. Network 108 may include wired, wireless, or fiber optic connections.

Computing device 104 may be a management server, a web server, or any other electronic device or computing system capable of processing program instructions and receiving and sending data. In some embodiments, computing device 104 may be a laptop computer, tablet computer, netbook computer, personal computer (PC), a desktop computer, or any programmable electronic device capable of communicating with computing device 104 via network 108. In other embodiments, computing device 104 may represent a server computing system utilizing multiple computers as a server system, such as in a cloud computing environment. In another embodiment, computing device 104 represents a computing system utilizing clustered computers and components to act as a single pool of seamless resources. In the depicted embodiment, computing device 104 includes witness program 110 and database 112. In other embodiments, computing device 104 may include any combination of witness program 110, database 112, or emergency personnel program 108. Computing device 104 may include components, as depicted and described in further detail with respect to FIG. 4.

Witness program 110 operates to gather the information from the witness, person involved in the accident, or other personnel that have access to the program 110 about the emergency situation, the location, notes, comments, pictures, videos, type of emergency, and other valuable information about the situation that will help the emergency personnel quickly and accurately respond to the situation. In the depicted embodiment, witness program 110 utilizes network 108 to access emergency personnel program 108 and database 112. In one embodiment, witness program 110 resides on computing device 104. In other embodiments, witness program 110 may be located on another server, portable electronic device, or computing device, provided witness program 110 has access to emergency personnel program 108 and database 112.

Data source function 114 operates to gather, analyze, categorize, and process the data provided by the personal about the situation, as received by witness program 110. In one embodiment, data source function 114 performs or applies a geospatial assessment of the witness programs 110 location. In another embodiment, data source function 114 activates various features and functions of the witness program 110 device to gather visual and audio at the scene and analyzes this information. In another embodiment, data source function 114 gathers user input information to analyze the situation at the scene and assess the best suited. In the depicted embodiment, data source function 114 is a function of witness program 104. In other embodiments, data source function 114 may be a stand-alone program located on another server, computing device, or program, provided data source function 114 has access to emergency personnel program 108 and database 112.

Database 112 may be a repository that may be written to and/or read by witness program 110 and emergency personnel program 108, data source function 114 and data gathering function 116. Such information may include geospatial temporal facts and events, audio, video, and user input information. In one embodiment, database 112 is a database management system (DBMS) used to allow the definition, creation, querying, update, and administration of a data base(s). In the depicted embodiment, database 112 resides on computing device 104. In other embodiments, database 112 resides on another server, or another computing device, provided that database 112 is accessible to geospatial program 104, structured data source 110, and unstructured data source 112.

Server 106 may be a management server, a web server, or any other electronic device or computing system capable of processing program instructions and receiving and sending data. In some embodiments, server 106 may be a laptop computer, tablet computer, netbook computer, personal computer (PC), a desktop computer, or any programmable electronic device capable of communicating with server 106 via network 108. In other embodiments, server 106 may represent a server computing system utilizing multiple computers as a server system, such as in a cloud computing environment. In another embodiment, server 106 represents a computing system utilizing clustered computers and components to act as a single pool of seamless resources. In the depicted embodiment, server 106 includes emergency personnel program 108. In other embodiments, server 106 may include any combination of witness program 110, database 112, or emergency personnel program 108. Server 106 may include components, as depicted and described in further detail with respect to FIG. 4.

Emergency Personnel program 108 operates to gather the information from the witness program 110, process the information, and direct the proper and services to the situation, as well as contact the personnel at the scene or personnel in the area to gather additional information. In the depicted embodiment, Emergency Personnel program 108 utilizes network 108 to access witness program 110 and database 112. In one embodiment, Emergency Personnel program 108 resides on computing device 104. In other embodiments, Emergency Personnel program 108 may be located on another server or computing device, provided Emergency Personnel program 108 has access to witness program 110 and database 112.

Data gathering function 116 operates to gather, analyze, categorize, and process the data provided by the personal about the situation, as received by witness program 110. In one embodiment, data gathering function 116 performs or applies a geospatial assessment of the witness programs 110 location as well as the location of emergency personnel in a geospatial assessment of their location relative to the scene. In another embodiment, data gathering function 116 connects with the data source or other users in a geospatial assessment relative to the location of the scene to gather additional information. In another embodiment, data gathering function 116 gathers and assess the information supplied by the witness and determines the proper emergency services to inform of the situation. In another embodiment, data gathering function 116 gathers user input information to analyze the situation at the scene and assess the best suited. In the depicted embodiment, data gathering function 116 is a function of emergency personnel program 108. In other embodiments, data gathering function 116 may be a stand-alone program located on another server, computing device, or program, provided data gathering function 116 has access to witness program 110 and database 112.

Figure 2:
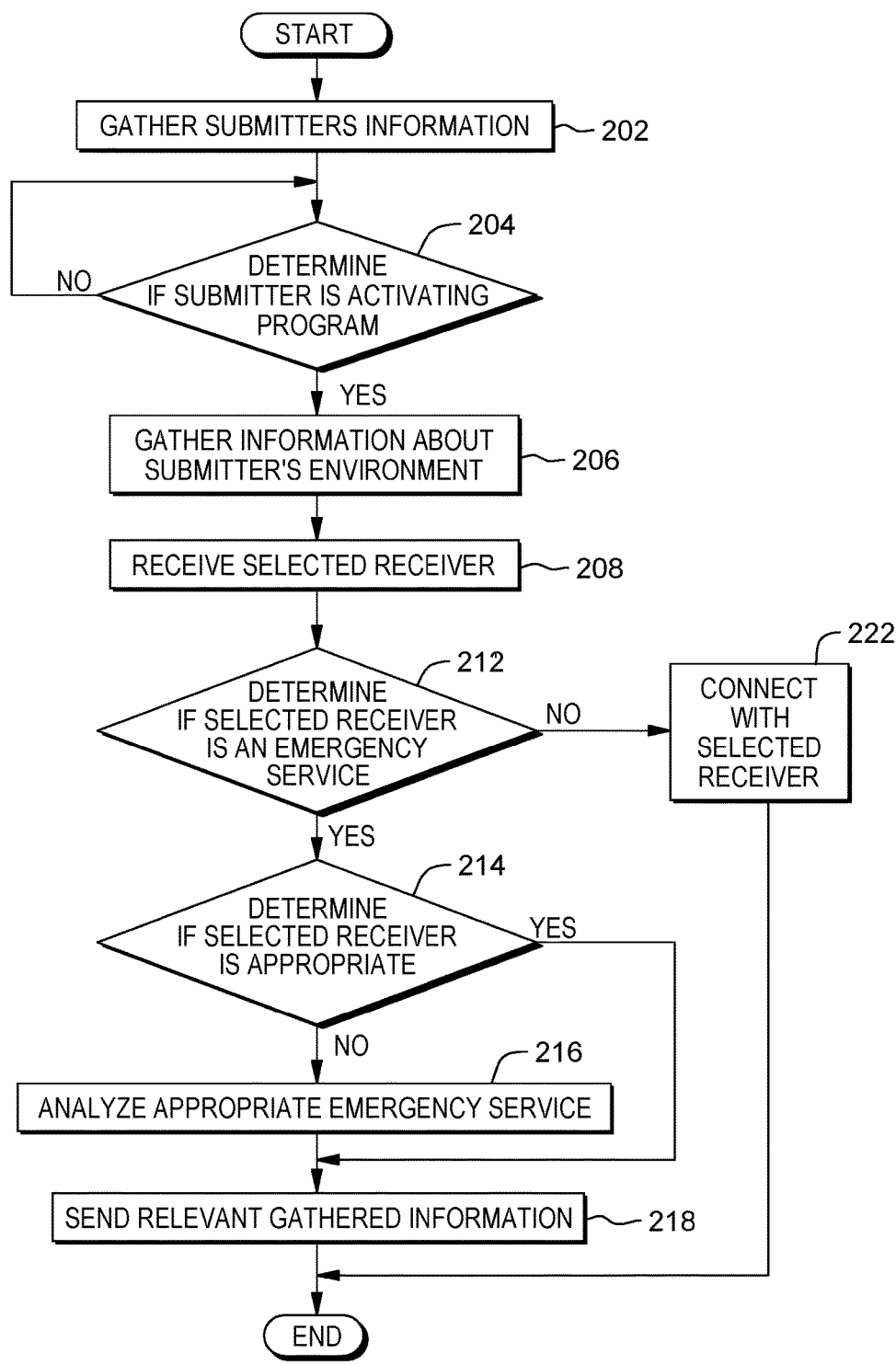
FIG. 2 depicts a flowchart of the operational steps taken by a witness function to report the emergency situation, within the computing environment of FIG. 1, in accordance with one embodiment of the present invention.

FIG. 2 depicts a flowchart of the operational steps taken by the data source function to gather information about an emergency or suspicious situation, within the computing environment of FIG. 1, in accordance with one embodiment of the present invention. It should be appreciated by one skilled in the art that FIG. 1 provides only an illustration of one implementation and does not imply any limitations with regard to the environments in which different embodiments may be implemented. Many modifications to the depicted environment may be made. The steps performed within flowchart 200 may be performed by either data source function 114 or data gathering function 116. In the described embodiment data source function 114 is used.

In Step 202, data source function 114 gathers submitter information. Data source function 114 gathers relevant information about the submitter. This information may be, but is not limited to, name, address, emergency contacts (e.g. father, mother, husband, wife, brother, friend, etc.), submitter's location, submitter's distress signals (e.g. key words to activate data source function 114, tests to determine stress in the submitter's voice), and the like.

In Decision 204, data source function 114 determines if submitter is activating program. In one embodiment, the device uses various features and functions (e.g. accelerometer, camera, microphone, global positioning system (GPS), or the like) to determine if the submitter is in an emergency situation such as a car accident, is witnessing a crime, or is in an emergency situation that would require additional and professional services to assist with the situation. If data source function 114 determines the submitter is activating the program (YES branch, proceed to step 206), data source function 114 gathers information about the submitters environment. If data source function 114 determines the submitter is not activating program (NO branch), data source function 114 remains in a standby state or enters a sleep mode.

In Step 206, data source function 114 gathers information about the submitters environment. In one embodiment, data source function 114 activates the various features of the device to gather visual, audio, and geospatial information about the submitter's environment that would be most useful to the receiver. For example, the data source function 114 may activate the speaker, microphone, front or rear facing camera, global positioning data, and various sensors (e.g. accelerometer, finger print scanner, or other like).

In Step 208, data source function 114 receives submitter's selected receivers. In one embodiment, the submitter preselects at least one receiver for the data source function 114 in the event of an emergency. For example, if the submitter is unable to activate the program, is injured, unconscious, or have lost their phone in the situation, the data source function 114 auto selects a predetermined emergency service and other receiver. In another embodiment, the submitter selects the appropriate personnel (e.g. mother, father, child, wife, husband, etc.) and the emergency service (e.g. police, ambulance, firemen, etc.).

In Decision 212, data source function 114 determines if the selected receiver is an emergency service. In some instances, the submitter may want to just contact their emergency contact when using the program and not one or all of the emergency services. For example, if damage is done to the submitter's home or property and there are no injured parties, but the data source function 114 determines an accident as occurred, the submitter may just want to inform their spouse or family member they are safe and the accident or damage that has been done and call the necessary parties at a more leisurely pace. If data source function 114 determines the selected receiver is an emergency service (YES branch, proceed to decision 214), data source function 114 determines if the user selected the appropriate emergency service. If data source function 114 determines the selected receiver is not an emergency service (NO branch, proceed to step 222), data source function 114 connects the submitter with the selected receiver.

In Decision 214, data source function 114 determines if the selected receiver is the appropriate receiver based on the gathered information. In some instances, the submitter may be confused, distressed, in a daze or unable to properly and articulately address to the data source function 114 the type of emergency situation and the most appropriate emergency service to respond to the situation. For example, if the microphone does not accurately hear the submitter, and records fire department, when it is a robbery. Or if the user selects the fire department when they should have selected the police because they accidently submit the incorrect command in the heat of the moment. If data source function 114 determines the selected receiver is the appropriate emergency service (YES branch, proceed to step 218), data source function 114 sends the relevant gathered information to the emergency service. If data source function 114 determines the selected receiver is not the appropriate emergency service (NO branch, proceed to step 216), data source function 114 analyzes the appropriate emergency service.

In Step 216, data source function 114 analyzes the appropriate emergency service to connect to. This is performed by processing the information/data gathered by the device and determining which emergency service to contact. For example, if the video is analyzed and a fire is determined to be present, the fire department would be the appropriate service. Additionally, if the audio is analyzed to determine someone has been injured, and the video shows blood, an ambulance would we called. In an additional embodiment, if the GPS located the submitter in the forest, a park ranger is selected. In some embodiments, all the information gathering features of the device are analyzed. In additional embodiments, some of the information is analyzed. In additional embodiments, the different data gathering features of the device are prioritized based on the degree of certainty which data source function 114 may measure from the feature. For example, if the camera is broken, or the microphone is unreadable, these features would be weighed less in the selection process.

In Step 218, data source function 114 connects with the selected receiver and relays the gathered information. In one embodiment, all the information gathered by the device is relayed to the selected receivers. In additional embodiments, a selection of the data is send based on the data source function 114 determining which data is most helpful to the specific emergency service.

In Step 222, data source function 114 connects with the selected receiver. Data source function 114 connects the submitter with the receiver either by sending a message or activating a call between the parties. In some embodiments, the selected receivers are prioritized so that the highest prioritized receiver is connected with a phone call with the submitter and the rest of the receivers send a confirmation message back to the submitter. In additional embodiments, an order is established and when the submitter is done with the first (priority) receiver, a second, third, fourth, etc. phone call is established with the remainder of the receivers.

Figure 3:
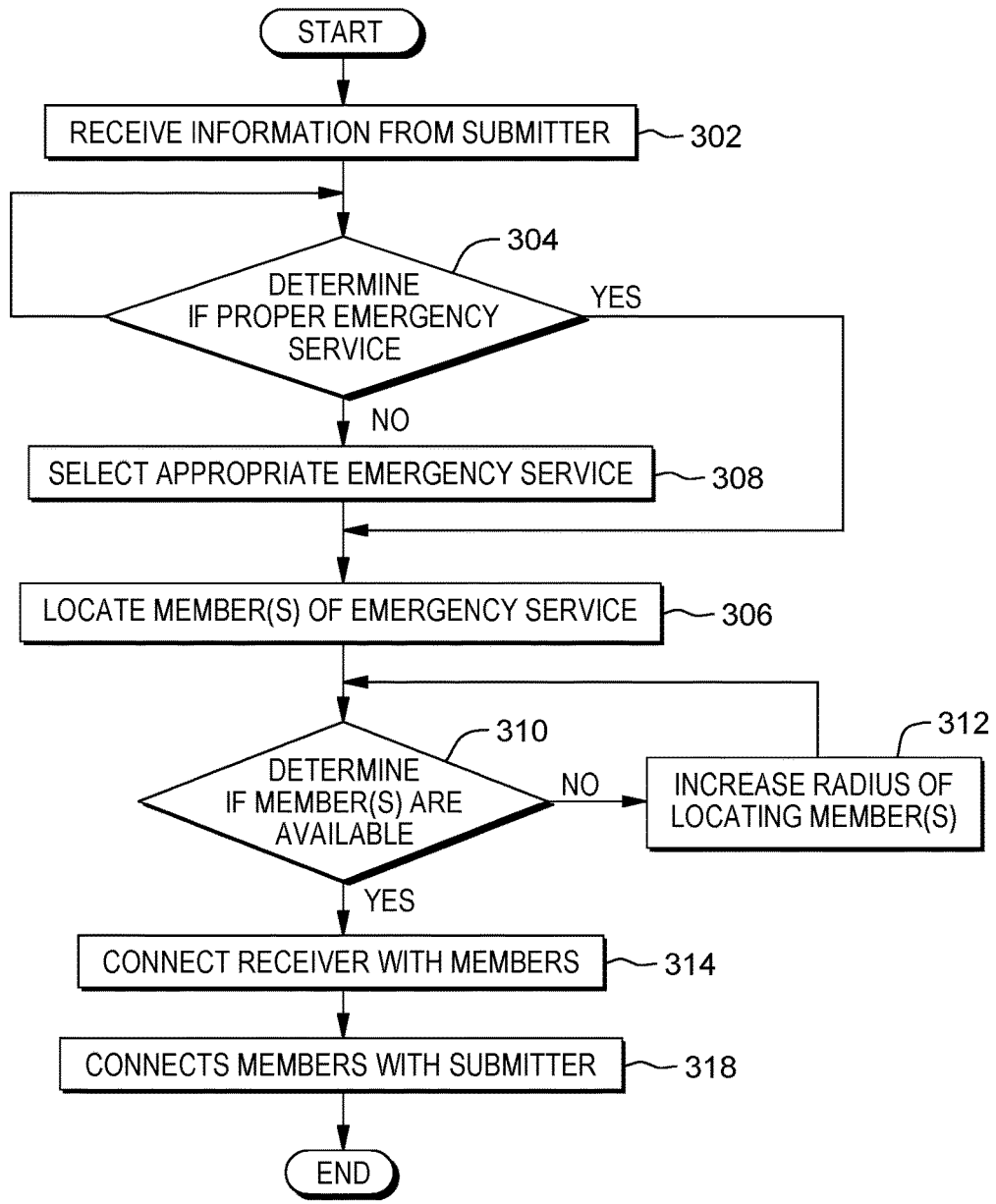
FIG. 3 depicts a flowchart of the operational steps taken by an emergency service respondent to the report of the emergency situation, within the computing environment of FIG. 1, in accordance with one embodiment of the present invention.

FIG. 3 depicts a flowchart of the operational steps taken by data gathering function 116 in response to a report of the emergency situation, within the computing environment of FIG. 1, in accordance with one embodiment of the present invention. It should be appreciated by one skilled in the art that FIG. 3 provides only an illustration of one implementation and does not imply any limitations with regard to the environments in which different embodiments may be implemented. Many modifications to the depicted environment may be made. The steps performed within flowchart 300 may be performed by either data source function 114 or data gathering program 116. In the described embodiment data gathering function 116 is used.

In Step 302, data gathering function 116 receives information from the submitter. The information or data received by the submitter is the audio, video, geospatial, or other information which was gathered by the computing device 104 at the scene of the emergency.

In Decision 304, data gathering function 116 determines if the proper emergency service has been contacted. As shown in FIG. 2, data source function 114 determines if the proper emergency service is contacted based on the type of emergency. Data gathering function 116 performs a similar analyzes to reconfirm that the proper emergency service is contacted. The decision is determined by analyzing the video, audio, inputs, and sensors of the device to determine if the proper agency has been selected. In one embodiment, a person reviews the supplied data and makes a final selection. In additional embodiments, a default emergency service is selected if a confirmation as to which emergency service should be selected. If data gathering function 116 determines the proper emergency service has been contacted (YES branch, proceed to step 306), data gathering function 116 locates member(s) of the emergency service. If data gathering function 116 determines the improper emergency service has been contacted (NO branch, proceed to step 308), data gathering function 116 selects the appropriate emergency service.

In Step 306, data gathering function 116 locates member(s) of that emergency service. In one embodiment, data gathering function 116 uses geospatial data associated with each member of the emergency service to pinpoint members within a predetermined radius related to the emergency situation. In another embodiment, data gathering function 116 has the information for the predefined areas of each member, and based on the location of the emergency locates at least one of the members within the predefined area.

In Step 308, data gathering function 116 selects the appropriate emergency service. Based on the information that is provided and gathered by the receiver, data gathering function 116 selects or reroutes the submitter to the correct emergency service to best assist them with the situation. This may be performed automatically after the data and information gathered is processed. In some embodiments, as additional information is gathered, the data gathering function 116 substantially continuously selects the appropriate emergency service(s).

In Decision 310, data gathering function 116 determines if member(s) are available to respond to the emergency situation. Data gathering function 116 locates member(s) of the selected emergency service personnel within a predetermined radius. In additional embodiments, data gathering function 116 locates member(s) of the selected, or unselected emergency service personnel which are known to be available based on what each member has previously been assigned to, or is known to be doing. For example, if one personnel is already responding to another call, they are viewed as unavailable even though they are located within the predetermined radius. If data gathering function 116 determines at least one member is available to respond (YES branch, proceed to step 314), data gathering function 116 connects the receiver with the member(s). If data gathering function 116 determines no member(s) are available to respond (NO branch, proceed to step 312), data gathering function 116 adjusts the area for locating member(s).

In Step 312, data gathering function 116 expands the search requirements. Data gathering function 116 increases the area to locate at least one available member of the emergency service to respond to the emergency situation. In some embodiments, the data gathering function 116 may increase the radius at predetermined increments, may continuously assess the members within the radius to determine if they become available, or may contact additional emergency services to the scene to assist while the other emergency services are located.

In Step 314, data gathering function 116 connects receiver with the selected member(s). Once an available service member(s) is located, the receiver of the information is connected with the member(s) to further discuss the situation, to provide updated information, or to alert the member of the situation they are arriving at so they are best suited to assist. In some embodiments, this connection is via an audio communication link. In additional embodiments, this is via a textual or geospatial link. In some embodiments, the member's equipment is automatically updated with the location and factual information about the scene so they can seamlessly transfer from the previous task to the current task, or to reduce the need to search for the location of the scene thereby reducing the amount of time without emergency personnel present.

In Step 318, data gathering function 116 connects the selected member(s) with the submitter. Data gathering function 116 may connect the member with the submitter to further gather data about the scene. This connection may be via textual or audio communication means.

Figure 4:
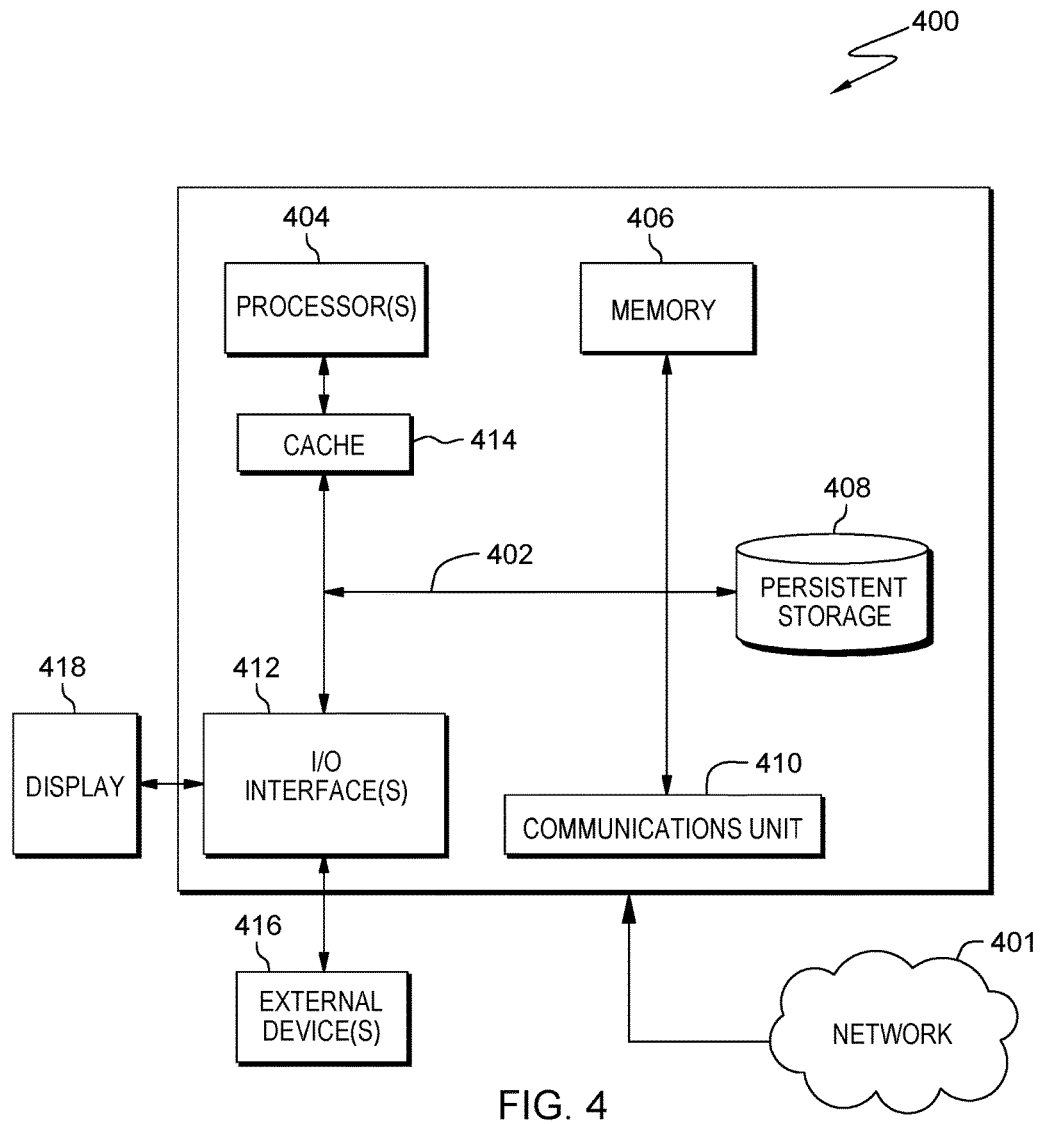
FIG. 4 depicts a block diagram of the internal and external components of the server and the authorized user computing device of FIG. 1, in accordance with one embodiment of the present invention.

FIG. 4 depicts a block diagram 400 of server 104 and server 106, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. It should be appreciated FIG. 4 provides only an illustration of one implementation and does not imply any limitations with regard to the environments in which different embodiments may be implemented. Many modifications to the depicted environment may be made.

An embodiment of a possible hardware and software environment for software and/or methods according to the present invention will now be described in detail with reference to the Figures. FIG. 4 depicts a block diagram 400 of components of a computing device, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 400 is, in many respects, representative of the various computer subsystem(s) in the present invention. Accordingly, several portions of computing environment 400 will now be discussed in the following paragraphs.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any additional hardware components within a system. For example, communications fabric 402 can be implemented with one or more buses.

Computing device 400 is capable of communicating with other computer subsystems via network 401. Network 401 can be, for example, a local area network (LAN), a wide area network (WAN) such as the Internet, or a combination of the two, and can include wired, wireless, or fiber optic connections. In general, network 401 can be any combination of connections and protocols that will support communications between computing device 400 and other computing devices.

Memory 406 and persistent storage 408 are computer-readable storage media. In one embodiment, memory 406 includes random access memory (RAM) and cache memory 414. In general, memory 406 can include any suitable volatile or non-volatile computer-readable storage media.

Memory 406 is stored for execution by one or more of the respective computer processors 404 of computing device 400 via one or more memories of memory 406 of computing device 400. In the depicted embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in the examples, provides for communications with other data processing systems or devices, including computing device 400. In the examples, communications unit 410 includes one or more network interface cards. Communications unit 410 may provide communications through the use of either or both physical and wireless communications links.

I/O interface(s) 412 allows for input and output of data with other devices that may be connected to computing device 400. For example, I/O interface 412 may provide a connection to external devices 416 such as a keyboard, keypad, camera, a touch screen, and/or some other suitable input device. External devices 416 can also include portable computer-readable storage media such as, for example, thumb drives, portable optical or magnetic disks, and memory cards. Software and data used to practice embodiments of the present invention, e.g., programs 108 and 110 can be stored on such portable computer-readable storage media and can be loaded onto persistent storage 408 of computing device 400 via I/O interface(s) 412 of computing device 400. Software and data used to practice embodiments of the present invention, e.g., program 108 and 110 can be stored on such portable computer-readable storage media and can be loaded onto persistent storage 408 of computing device 400 via I/O interface(s) 412 of computing device 400. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for connecting emergency personnel with an emergency situation, the method comprising:
    detecting, by one or more processors, a request for assistance made by a submitter;
    gathering, by one or more processors, a set of data from the submitter, wherein the set of data includes an audio recording of the request made by the submitter;
    analyzing, by one or more processors, the set of data from the submitter, wherein the audio recording of the submitter is analyzed for distress signals, and determining, at least one emergency service to respond to the request based on the analyzed set of data;
    selecting, by one or more processors, a first portion of the analyzed set of data associated with the selected emergency service and a second portion of the analyzed set of data associated with an emergency contact;
    locating, by one or more processors, at least one member of the emergency service within a predetermined area based on the location of the submitter;
    contacting, by one or more processors, the at least one member of the emergency service within the predetermined area based on the location of the submitter;
    determining, by one or more processors, if the at least one member of the emergency service is available to respond to the request, wherein if it is determined that the at least one member of the emergency service is available;
    providing, by one or more processors, the at least one member of the emergency service with the first portion of the set of data; and
    sending, by one or more processors, a second portion of the set of data to at least one emergency contact.

2. The method of claim 1, wherein if it is determined that no member of the emergency service is available to respond to the request, increasing, by one or more processors, the area which another member of the emergency service is contacted to respond to the emergency situation.

3. The method of claim 1, wherein if it is determined that no member of the emergency service is available to respond to the request, identifying a second emergency service to contact within the predetermined radius from the submitter.

4. The method of claim 1, further comprising, scanning, by one or more processors, members of the emergency service within the predetermined radius from the submitter to determine if additional members of the emergency service come within the predetermined radius from the submitter.

5. The method of claim 1, wherein the audio recording of the submitter is analyzed for distress signals, further comprising;
    determining, by one or more processors, the submitter's distress level based on the detected stress signals; and
    providing, by one or more processors, the location of the submitter.

6. A computer program product for connecting emergency personnel with an emergency situation, the computer program product comprising:
    one or more computer readable storage media and program instructions stored on the one or more computer readable storage media, the program instructions comprising:
    program instructions to detect a request for assistance made by a submitter;
    program instructions to gather a set of data from the submitter, wherein the set of data includes an audio recording of the request made by the submitter;
    program instructions to analyze the set of data from the submitter, wherein the audio recording of the submitter is analyzed for distress signals, and determining, at least one emergency service to respond to the request based on the analyzed set of data;

program instructions to select a first a first portion of the analyzed set of data associated with the selected emergency service and a second portion of the analyzed set of data associated with an emergency contact;

program instructions to locate at least one member of the emergency service within a predetermined area based on the emergency situation location of the submitter;

program instructions to contact the at least one member of the emergency service within the predetermined area based on the location of the submitter;

program instructions to determine if the at least one member of the emergency service is available to respond to the request, wherein if it is determined that the at least one member of the emergency service is available; and program instructions to provide the at least one member of the emergency service with the first portion of the set of data;

program instructions to send a second portion of the set of data to at least one emergency contact.

7. The computer program product of claim 6, wherein if it is determined that no member of the emergency service is available to respond to the request, program instructions to increase the area which another member of the emergency service is contacted to respond to the emergency situation.

8. A computer system for connecting emergency personnel with an emergency situation, the computer system comprising:

one or more computer processors, one or more computer readable storage media, and program instructions stored on the one or more computer readable storage media for execution by at least one of the one or more processors, the program system comprising:

program instructions to detect a request for assistance made by a submitter;

program instructions to gather a set of data from the submitter, wherein the set of data includes an audio recording of the request made by the submitter;

program instructions to analyze the set of data from the submitter, wherein the audio recording of the submitter is analyzed for distress signals, and determining, at least one emergency service to respond to the request based on the analyzed set of data;

program instructions to select a first a first portion of the analyzed set of data associated with the selected emergency service and a second portion of the analyzed set of data associated with an emergency contact;

program instructions to locate at least one member of the emergency service within a predetermined area based on the emergency situation location of the submitter;

program instructions to contact the at least one member of the emergency service within the predetermined area based on the location of the submitter;

program instructions to determine if the at least one member of the emergency service is available to respond to the request, wherein if it is determined that the at least one member of the emergency service is available; and program instructions to provide the at least one member of the emergency service with the first portion of the set of data;

program instructions to send a second portion of the set of data to at least one emergency contact.

9. The computer system of claim 8, wherein if it is determined that no member of the emergency service is available to respond to the request, program instructions to increase the area which another member of the emergency service is contacted to respond to the emergency situation.

* * * * *